C. W. DAVIS.
AUTO TOWING AND STEERING APPLIANCE.
APPLICATION FILED MAR. 1, 1921.
1,414,552.
Patented May 2, 1922.
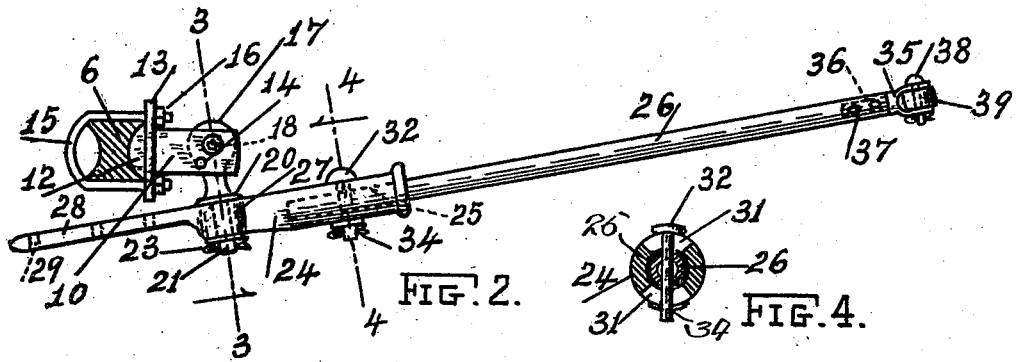
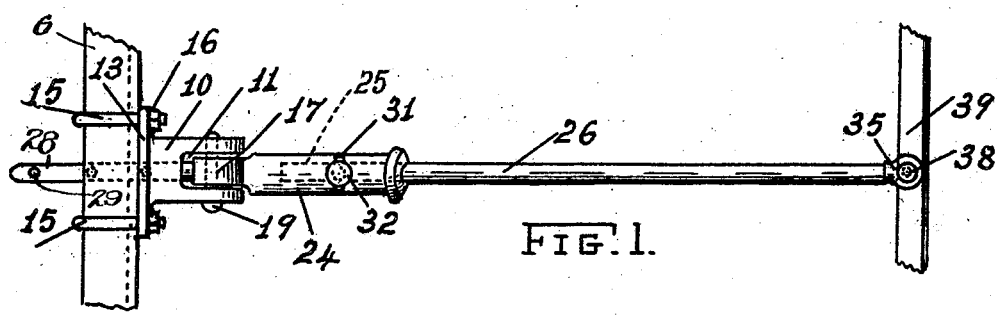
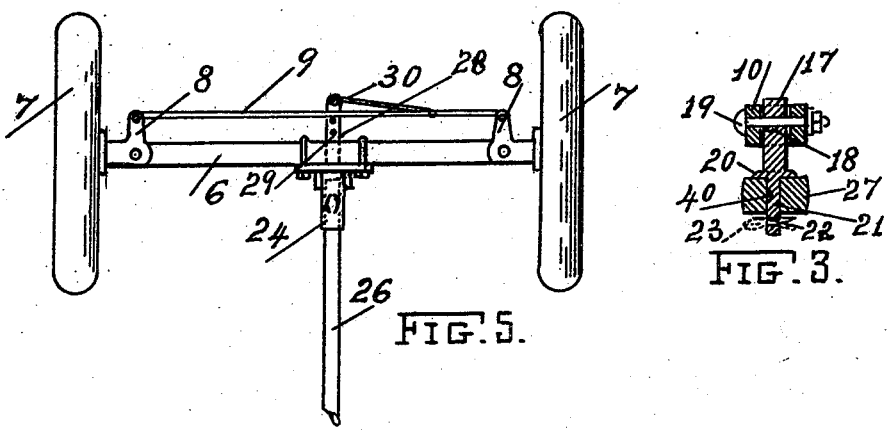
Claude W. Davis. INVENTOR.
BY N. Du Bois.
ATTORNEY.

UNITED STATES PATENT OFFICE.

CLAUDE W. DAVIS, OF SPRINGFIELD, ILLINOIS.

AUTO TOWING AND STEERING APPLIANCE.

1,414,552.   Specification of Letters Patent.   Patented May 2, 1922.

Application filed March 1, 1921. Serial No. 448,833.

*To all whom it may concern:*

Be it known that I, CLAUDE W. DAVIS, a citizen of the United States, residing in the city of Springfield, in the county of Sangamon and State of Illinois, have invented a new and useful Auto Towing and Steering Appliance, of which the following is a specification.

The invention relates to improved means for towing and steering automobiles.

The purposes of the invention are to provide improved means for connecting the disabled or towed vehicle with the towing vehicle in such manner that the towed vehicle will automatically follow the track of the towing vehicle; to provide a towing appliance comprising a supporting block readily attachable to or detachable from the front axle of the vehicle which is to be towed; to provide a basal structure having a swivel connection and a hinge connection with the supporting block, to adapt the appliance for use on axles at different heights from the ground, and to facilitate turning of the towed vehicle so that it will accurately follow the track of the pulling vehicle; also having an arm adapted for variable connection with the usual steering rod which controls changes in direction of travel of the front wheels of the vehicle which is to be towed; to provide a tongue having its axis in an extension of the longitudinal axis of the basal structure and capable of limited rotation on its axis, to permit the appliance to readily adapt itself to the varying lateral inclinations of the road on which the pulling vehicle and the towed vehicle may be traveling; to provide means for connecting the tongue with the towed vehicle; and to provide other details of construction, as will hereinafter appear.

With these ends in view the invention consists in the new and useful features of construction and combinations of parts shown in the annexed drawing to which reference is hereby made; and hereinafter fully described and finally recited in the claim.

The invention is illustrated in the annexed drawing in which Figure 1 is a top plan of an auto-towing and steering appliance embodying my invention, in conjunction with the axle of a vehicle which is to be towed; Fig. 2 is a side elevation of the same appliance, the vehicle axle being shown in section; Fig. 3 is an enlarged transverse section taken on the line 3. 3. of Fig. 2; Fig. 4 is an enlarged transverse section taken on the line 4. 4. of Fig. 2; and Fig. 5 is a diagrammatic plan view, on a reduced scale, showing the same towing and steering appliance in connection with the front axle of an automobile and connected to operate the steering rod of the automobile. The same reference numerals designate the same parts in all the views.

The vehicle axle 6, the wheels 7, the bellcranks 8, having the usual spindles on which the wheels rotate, and the steering rod 9 connecting the ends of the bell cranks may be of any usual or approved construction.

The connecting block comprises in one casting a member 10 having a fork 11 to accommodate the hinge member of the hinge and swivel connection; a member 12 conformed to and fitted closely against the longitudinal face of the axle 6 to prevent rocking; and a flange 13 having holes to receive U-bolts securing the block on the axle. The block also has transverse holes 14 admitting of variable connection of the hinge member with the block, according to the height of the axle. U-bolts 15 surround the axle and extend through holes in the flange 13 and have nuts 16 which secure the block and the bolts on the axle.

The hinge and swivel connection is preferably of wrought iron or steel and comprises in one piece a hinge-member 17 having an eye 18, to receive the bolt 19 pivotally connecting it with the block 10; a shoulder 20; and a swivel member 21 having a transverse hole 22 to receive a key or cotter pin 23.

The basal structure is preferably a casting comprising a body 24 having a central bore 25 accommodating the gas-pipe tongue 26; a hub 27 having a bore 40 receiving the swivel member 21; an extension 28 provided with a series of holes 29 to receive a rod 30 operatively connecting the extension with the steering rod 9 and transverse slots 31 permitting the bolt 32, which connects the tongue 26 with the body 24, to freely traverse the slots upon partial rotation of the body 24 around the tongue, or partial rotation of the tongue in the body, the extent of rotation in either case being limited by the end walls of the slots. The bolt 32 has a transverse hole not shown receiving a cotter pin 34. When it is desired to detach the tongue the cotter pin will be taken out and the bolt will be removed, whereupon the tongue may be easily pulled out of the bore 25.

The clevis 35 has a stem 36 driven into the end of the tongue and secured by rivets 37.

To connect the tongue with the towing vehicle I prefer to use a draw bar 39 having a central hole to receive the bolt 38, the bar being long enough to extend across the rear of the vehicle and project through the rear springs on both sides of the vehicle, so as to pull alike on both springs. Any other suitable means for connecting the clevis with the towing vehicle may be used, such for example as a chain wound around the axle of the towing vehicle and having both of its ends connected with the bolt 38; or a large clevis (not shown) adapted to clamp around the rear axle housing of the vehicle.

It is to be noted that the hinge connection of the member 17 with the block 10, the swivel connection of the same member with the body 24, and the means admitting of limited rotation of the tongue in the body 24, constitute a universal-joint connection between the tongue and the stationary block 10, making the appliance as a whole flexible and effective under all ordinary conditions of use.

The mode of operation is obvious from the description and therefore need not be repeated here.

I do not restrict my claims to the precise details of construction shown and described, inasmuch as minor details may be varied without departure from my invention.

Having fully described my invention, what I claim and desire to secure by Letters Patent is:

A towing and steering appliance comprising a basal structure having a longitudinal bore, transverse slots opening into said bore, a vertical hole through said body structure and an extended perforated arm; a tongue rotative in the bore of the body structure and having a transverse hole; a bolt extending through the transverse slots of the body structure and through the transverse hole in the tongue and engaging the end walls of said slots to limit rotation of the tongue in the bore of the body structure; a hinge member swiveled in the transverse hole of the basal structure and a connecting block on which said hinge member is pivoted.

In witness whereof I have hereunto signed my name at Springfield, Illinois, this 11 day of February, A. D. 1921.

CLAUDE W. DAVIS.

Witnesses:
C. C. BIERMAN,
E. L. BRONSON.